United States Patent Office 3,527,658
Patented Sept. 8, 1970

3,527,658
LOW TEMPERATURE CATALYSTS FOR
CELLULOSE ETHERIFICATIONS
Ralph J. Berni, Metairie, Elwood J. Gonzales, Gretna, and Ruth R. Benerito, New Orleans, La., assignors to the United States of America as represented by the Secretary of Agriculture
No Drawing. Filed Aug. 23, 1968, Ser. No. 754,955
Int. Cl. D06m 15/56, 13/48
U.S. Cl. 117—139.4        12 Claims

ABSTRACT OF THE DISCLOSURE

Cotton fabrics were reacted with certain N-methylol cyclic urea resins in the presence of a mixed catalyst system comprised of $MgCl_2$ and certain substituted acetic acids or dibasic acids at temperatures about from 105° to 125° C. for about three minutes, to yield resin-treated fabrics with permanent press properties consisting of high conditioned and wet crease recovery without yellowing during the curing operation.

A non-exclusive, irrevocable, royalty-free license in the invention herein described, throughout the world for all purposes of the United States Government, with the power to grant sublicenses for such purposes, is hereby granted to the Government of the United States of America.

This invention relates to certain low temperature-curing catalyst systems employable in cellulose etherifications. Specifically, this invention relates to additive catalyst or coreactants which can be used with various N-methylol permanent press agents in the textile industry at relatively low temperatures of cure. More specifically, this invention relates to the use of cyano-, amino-, substituted amino, or thio-substituted acetic acids or dibasic acids with magnesium chloride to promote greater reactivity and impart crease recovery to fabrics resin treated with N-methylol-type compounds at lower, more suitable, cure temperatures, to avoid excessive discoloration due to high temperatures of cure without undue loss of tensile strength or loss of hand. The invention finds utility in providing a more efficient means of producing permanent press properties without excessive fabric strength loss and discoloration.

Prior art processes use metal chloride complexes, more specifically zinc and magnesium chloride, as catalysts for N-methylol crosslinking agents at temperatures of 160° C. or above to produce permanent press garments. The high temperatures of cure employed are unsuitable because of discoloration of treated fabrics, particularly white all-cotton goods. Excessive abrasion and tensile strength loss in treated fabrics are experienced when using this high temperature of cure.

The process of the instant invention is applicable to any cellulosic material containing free hydroxyl groups and can be employed with cotton, viscose, flax, ramie, and the like.

In reacting the cellulosic material with the etherifying agent (N-methylol cyclic urea type) substantially any apparatus usually employed in the etherification of cellulose fabrics can be employed. In carrying out the process, the cellulosic material to be reacted is first twice padded with an aqueous solution containing the following composition per 100 g. of solution:

|  | G. |
|---|---|
| Dimethylolethylene urea or dimethyloldihydroxyethylene urea (0.55 molar) | 8.0 |
| $MgCl_2 \cdot 6H_2O$ (0.03 molar) | 0.83 |
| Cyanoacetic acid (0.03 molar) | 0.23 |
| Water | 90.94 |

The fabric, after padding, had a wet pickup of 90–100% and was dried at 60° C. for 7 minutes followed by a cure of from 105° to 125° C. for 3 minutes. The fabrics were then water-washed free of unreacted resin and allowed to dry and equilibrate before testing. Fabrics so treated have all the properties typical of excellent permanent press garments with the added feature of absence of discoloration on white cotton fabrics.

To summarize, the process of the instant invention can best be described as one imparting permanent press properties to cellulosic textiles, comprising—

(a) Impregnating the collulosic material with an aqueous (about 10% solids) solution containing an N-methylol cyclic urea and a mixed catalyst (metal salt and organic acid) consisting of magnesium chloride and an organic acid selected from the group consisting of cyanoacetic acid, aminoacetic acid, oxalic acid, malonic acid, succinic acid, glutaric acid, and thiohydroxyacetic acid; wherein the resin to metal salt to organic acid ratio is of about from 11.5:0.25:1 to 92:9:1, respectively, (b) Removing the excess to a wet pickup of about 95%, (c) Drying the wet impregnated cellulosic material at temperatures about from 50° to 75° C., for about from 4 to 10 minutes of time, using the lower temperatures with the longer periods of time, (d) Curing the dry impregnated material at temperatures about from 105° to 125° C., for about from 2 to 5 minutes of time, using the lower temperatures with the longer periods of time.

EXAMPLE 1

An 80 x 80 cotton fabric sample (approximately 10 g.) was padded twice with a solution containing 8.0 g. of dimethyloldihydroxy ethylene urea (DMDHEU), 0.83 g. of $MgCl_2 \cdot 6H_2O$, 0.23 g. of cyanoacetic acid, and 90.94 g. of water to 90–100% wet pickup, then dried at 60° C. for 7 minutes and cured at 125° C. for 3 minutes. The fabric sample was then soaked in hot tap water for 15 minutes, then tumble dried. The fabric after equilibration overnight had a conditioned (dry) crease recovery of 299° and a wet crease recovery of 285°, a nitrogen content of 1.4% and a formaldehyde content of 2.4%. The fabric retained its original white color. (A fabric treated at above with 0.06 M $MgCl_2$ as catalyst had a dry and wet crease recovery of 245° and 239° respectively, with a nitrogen content of 1.2% and a formaldehyde content of 1.3%.)

EXAMPLE 2

An 80 x 80 fabric sample was treated with the ingredients and by the procedure of Example 1 except that the curing temperature was 105° C. The treated fabric had an add-on of 6.7%, dry and wet crease recovery of 265° and 241° (warp+fill) respectively, and a nitrogen and formaldehyde content of 1.32 and 1.90%, respectively. A sample treated as above with 0.06 M $MgCl_2$ had a weight add-on of 1.8%, a dry and wet crease recovery of 196 and 180°, respectively, and a nitrogen and formaldehyde content of 0.29 and 0.19%, respectively.

EXAMPLES 3 THROUGH 9

Seven 80 x 80 cotton fabric samples were treated by the procedure of Example 1, except for the variation of catalysts. Significant data is listed in the following table:

TABLE I

| Example | Catalyst system [1] | Weight add-on, percent | Crease Angles, (W+F)° Dry | Crease Angles, (W+F)° Wet | N, percent | HCHO, percent |
|---|---|---|---|---|---|---|
| 3 | Aminoacetic acid, MgCl₂ | 5.2 | 278 | 253 | 1.1 | 2.1 |
| 4 | Diethylaminoacetic acid, MgCl₂ | 5.8 | 267 | 248 | 0.9 | 2.1 |
| 5 | Thioglycolic acid, MgCl₂ | 6.8 | 289 | 256 | 1.4 | 1.1 |
| 6 | Oxalic acid, MgCl₂ | 4.5 | 300 | 302 | 1.8 | 1.9 |
| 7 | Malonic acid, MgCl₂ | 5.4 | 303 | 275 | 1.3 | 1.9 |
| 8 | Succinic acid, MgCl₂ | 6.6 | 273 | 275 | 2.1 | 2.2 |
| 9 | Glutaric acid, MgCl₂ | 6.6 | 259 | 265 | 1.4 | 0.93 |

[1] Equimolar (0.03M) quantities of MgCl₂ and substituted acids were used.

EXAMPLES 10 THROUGH 12

Three 80 x 80 cotton fabric samples were treated by the procedure of Example 1 except for the catalysts listed in the following table and the substitution of dimethylolethylene urea (DMEU) for DMDHEU and a curing temperature of 115° instead of 125° C.

TABLE II

| Example | Catalyst system [1] | Weight Add-on, percent | Crease Angles, (W+F)° Dry | Crease Angles, (W+F)° Wet | N, percent | HCHO, percent |
|---|---|---|---|---|---|---|
| 10 | Cyanoacetic acid | 6.2 | 296 | 250 | 1.5 | 1.5 |
| 11 | Aminoacetic acid, MgCl₂ | 5.9 | 291 | 241 | 1.5 | 1.4 |
| 12 | Thiohydroxyacetic acid, MgCl₂ | 5.7 | 273 | 258 | 1.5 | 2.3 |

[1] Equimolar (0.03M) quantities of MgCl₂ and substituted acids were used.

A fabric treated with 0.06 M MgCl₂ as catalyst for comparative purposes had a dry and wet crease recovery of 266° and 233° (warp+fill), respectively, and a nitrogen and formaldehyde content of 0.86 and 1.0%, respectively.

EXAMPLES 13 THROUGH 16

The following 80 x 80 cotton fabric samples were treated by the procedure in Example 1 with the exception that the molar ratio of MgCl₂ to cyanoacetic acid varied as in the following table:

TABLE III

| Example | Molarity of catalyst MgCl₂ | Molarity of catalyst Cyanoacetic acid | Add-on, percent | Crease angles (W+F)° Dry | Crease angles (W+F)° Wet | N, percent | HCHO, percent |
|---|---|---|---|---|---|---|---|
| 13 | 0.012 | 0.048 | 5.7 | 287 | 284 | 1.3 | 1.8 |
| 14 | 0.030 | 0.030 | 6.0 | 294 | 274 | 0.9 | 1.6 |
| 15 | 0.054 | 0.006 | 6.3 | 284 | 269 | 1.7 | 2.1 |
| 16 | 0.059 | 0.001 | 5.7 | 254 | 245 | 1.2 | 1.8 |

We claim:

1. A process for imparting permanent press properties to a cellulosic textile, comprising:
   (a) impregnating the cellulosic material with an aqueous about 10% solids solution containing an N-methylol cyclic urea selected from the group of resins consisting of:
      dimethylolethylene urea,
      dimethylolpropylene urea,
      dimethyloldihydroxyethylene urea, and
      dimethylol-5-hydroxypropylene urea; and
   a mixed catalyst consisting of magnesium chloride and an organic acid selected from the group consisting of:
      cyanoacetic acid,
      aminoacetic acid,
      oxalic acid,
      malonic acid,
      succinic acid,
      blutaric acid, and
      thiohydroxyacetic acid;
   wherein the resin to magesium chloride to organic acid ratio is of about from 11.5:0.25:1 to 92:9:1, respectively,
   (b) removing the excess to a wet pickup of about 95%,
   (c) drying the wet impregnated cellulosic material at temperatures about from 50° to 75° C., for about from 4 to 10 minutes of time, using the lower temperatures within the longer periods of time, and
   (d) curing the dry impregnated material at temperatures about from 105° to 125° C., for about from 2 to 5 minutes of time, using the lower temperatures with the longer periods of time.

2. The process of claim 1 wherein the resin selected is dimethylolethylene urea.

3. The process of claim 1 wherein the resin selected is dimethylolpropylene urea.

4. The process of claim 1 wherein the resin selected is dimethyloldihydroxyethylene urea.

5. The process of claim 1 wherein the resin selected is dimethylol-5-hydroxypropylene urea.

6. The process of claim 1 wherein the organic acid selected is cyanoacetic acid.

7. The process of claim 1 wherein the organic acid selected is aminoacetic acid.

8. The process of claim 1 wherein the organic acid selected is oxalic acid.

9. The process of claim 1 wherein the organic acid selected is maloic acid.

10. The process of claim 1 wherein the organic acid selected is succinic acid.

11. The process of claim 1 wherein the organic acid selected is glutaric acid.

12. The process of claim 1 wherein the organic acid selected is thiohydroxyacetic acid.

References Cited

UNITED STATES PATENTS 3,139,322   6/1964   Hushebeck _____ 8—116.3
3,186,954   6/1965   Hushebeck _____ 117—139.4 X
3,407,026   10/1968  Mauldin _____ 8—116.3 X WILLIAM D. MARTIN, Primary Examiner T. G. DAVIS, Assistant Examiner U.S. Cl. X.R.

8—116.3; 117—143, 145